Patented Dec. 2, 1947

2,431,718

UNITED STATES PATENT OFFICE 2,431,718

UNSATURATED KETONE EPOXIDES AND PROCESS FOR PRODUCING SAME

Richard S. Wilder, Elkins Park, and Arthur A. Dolnick, Philadelphia, Pa., assignors to Publicker Commercial Alcohol Company, Philadelphia, Pa.

No Drawing. Application July 11, 1945, Serial No. 604,534

14 Claims. (Cl. 260—348)

The present invention relates to unsaturated ketone epoxides including new and heretofore unknown compounds and it relates more particularly to new processes for preparing the same.

An object of the present invention is to provide new unsaturated ketone epoxides and processes for producing the same. Another object of the present invention is to provide a simple, inexpensive, efficient and commercially practical process for producing unsaturated ketone epoxides.

Other objects and advantages of the present invention are apparent in the following detailed description and appended claims.

Very little has been known in the past concerning unsaturated ketone epoxides; that is, compounds having the general formula:

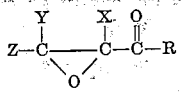

wherein R represents an alkyl or aryl group and X, Y and Z are members of the group consisting of hydrogen, alkyl, aryl and aralkyl.

Chemik Polski 15, 106–110 (1917) describes the preparation of α,α-dimethyl,β-acetyl,α.β-oxidoethane, hereinafter referred to as mesityl oxide epoxide, and having the formula:

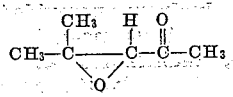

Mesityl oxide epoxide was prepared, according to the foregoing article, by the action of 20% potassium carbonate solution on mesityl oxide chlorohydrin; the product being described as a pale yellow oil having a pleasant odor and a boiling point of 54–55° C. at 15 mm.

Weitz and Scheffer, Ber. 64B, 2327–40 (1921), reported the preparation of epoxides of cinnamyl methyl ketone and of mesityl oxide by treatment of these compounds, in an organic solvent, in the presence of alkali with 15% hydrogen peroxide; the article stressing the advantages of a homogeneous reaction mixture. The mesityl oxide epoxide was isolated by extraction with ether, followed by fractional distillation in vacuo and was reported as boiling at 44–48° C. at 15 mm.; a temperature considerably lower than that previously reported in Chemik Polski, supra.

German Patent No. 395,435 was granted to Weitz in 1924 on the process disclosed in the Berichte article.

While Weitz and Scheffer did not report their yields, we have found that, by following their described procedure as carefully as possible, the best yield of epoxide obtainable from mesityl oxide is only about 30% of theory. The yield of epoxide of cinnamyl methyl ketone obtainable is correspondingly low. In addition to the low yield obtainable, their process is commercially impracticable since it requires the use of methyl alcohol or some other costly organic solvent as a reaction medium and further requires large quantities of ether for extraction and isolation of the product.

We have found, however, that by treating unsaturated ketones with hydrogen peroxide under different conditions from those disclosed by Weitz and Scheffer, it is possible to obtain corresponding unsaturated ketone epoxides simply and inexpensively and with good yield and high purity; the yields obtainable being as high as 87% or more of theory.

Additionally, we have succeeded in preparing, as a new compound, a certain unsaturated ketone epoxide heretofore unknown.

Generally speaking, the process of the present invention comprises the treatment of an unsaturated ketone with hydrogen peroxide in alkaline aqueous non-homogeneous suspension, with stirring, with the production of the corresponding unsaturated ketone epoxide according to the following equation:

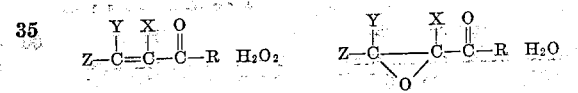

wherein R represents an alkyl or aryl group and X, Y and Z are members of the group consisting of hydrogen, alkyl, aryl and aralkyl.

We have found that, by conducting the reaction in the presence of a small amount of magnesium sulphate, good yields are obtained more consistently, and there is less of a tendency toward undesirable side reactions (as indicated by darkening of the reaction mixture). In place of magnesium sulphate, we may use other water soluble metal salts, such as chlorides, sulfates, and nitrates of magnesium, and the other alkaline earth metals. Among the compounds which have been tried and have been found to work satisfactorily are magnesium chloride, calcium chloride, and strontium nitrate.

We have also found that the presence of various other compounds cause definite lowering of the yield; examples of these harmful compounds including nickel sulphate, manganese sulphate, silver oxide and ferric chloride.

Another feature of our invention is the discovery that, in place of the complicated and expensive recovery procedure followed by Weitz and Scheffer, we can recover the unsaturated ketone epoxide by salting out the crude product from the aqueous mixture following the reaction and by thereafter separating and distilling the organic layer at atmospheric pressure. This separation procedure is not only much more simple than that of Weitz and Scheffer, but also, quite unexpectedly, gives considerably higher yields.

By employing the novel process as outlined above, we have succeeded in preparing and isolating, for the first time, the compound 1-acetyl, 1-methyl, 1,2-epoxy-ethane.

The following are illustrative but not restrictive examples of the process of the present invention.

*Example 1*

100 parts by weight of mesityl oxide is cooled and, while the temperature is kept below about 10° C., a solution of 4 parts of sodium hydroxide in 150 parts of water is run in, with thorough agitation, after which 1.25 parts of crystalline magnesium sulphate is added. 165 parts of 30% aqueous hydrogen peroxide is then added slowly, over a period of about 30 minutes, while the temperature is maintained at about 10° C. The agitation is continued for 30 to 60 minutes after the last of the hydrogen peroxide has been added to permit the reaction to go to completion; the reaction mixture remaining colorless throughout.

Thereafter, 100 parts of sodium sulphate is added to the reaction mixture and, after stirring for about one hour, the mixture is allowed to stand for some time to permit separation into two layers.

The upper layer is drawn off and is distilled at atmospheric pressure. The fraction boiling at 154–158° C. is collected and consists of practically pure mesityl oxide epoxide. By again salting the lower-boiling fractions and re-distilling them, the total yield can be increased to about 87% or more of theory.

By re-distilling the above product, pure mesityl oxide epoxide can be obtained as a colorless liquid having a mild, agreeable odor and boiling at 155.5–157.5° C. The compound has a boiling point of approximately 61° C. at 18 mm. and has a boiling point of 69–70° C. at 29 mm. The compound melts at about −2 to −1° C. and has a specific gravity of 0.9707 at 20° C. Mesityl oxide epoxide is soluble in water to the extent of 53% by weight and water is soluble in mesityl oxide epoxide to the extent of 19% by weight at 23° C. Mesityl oxide epoxide $n_D^{20} = 1.4238$. The purified product was found on ultimate analysis to contain 63.1% of carbon (as compared to the theoretical 63.2%) and 8.5% hydrogen (as compared to the theoretical 8.8%).

The stability of the mesityl oxide epoxide prepared according to our present process is in contradiction to the disclosures of the prior art wherein it is suggested that this compound is unstable to heat; no atmospheric boiling points being given and distillations being carried out in vacuo.

Mesityl oxide epoxide as prepared by our process is miscible with all of the common organic solvents. Mesityl oxide epoxide and water form an azeotrope boiling at 98–99° C. and containing about 43% by weight of water; the condensate separating into two phases.

*Example 2*

148 parts of 28% hydrogen peroxide is slowly added to a thoroughly agitated mixture of 100 parts of mesityl oxide, 150 parts of water, 4 parts of sodium hydroxide and 0.6 part of calcium chloride; the temperature being maintained at approximately 5–10° C. during the addition.

Thereafter, 90 parts of anhydrous sodium sulphate is stirred into the colorless reaction mixture. The organic layer is separated and distilled as described in Example 1, and mesityl oxide epoxide is obtained in very good yield.

If the calcium chloride is left out of the charge, the reaction mixture becomes quite dark and considerable decomposition occurs with resulting loss in yield or mesityl oxide epoxide.

*Example 3*

The procedure of Example 2 is repeated except that zinc chloride is used in place of calcium chloride. Results generally as good as those of Example 2 are obtained.

*Example 4*

The procedure of Example 2 is repeated except that strontium nitrate is used in place of calcium chloride. Results generally as good as those of Example 2 are obtained.

*Example 5*

The procedure of Example 2 is repeated except that barium chloride is used in place of calcium chloride. Results generally as good as those of Example 2 are obtained.

*Example 6*

100 parts of methyl isopropenyl ketone containing 0.2 part of hydroquinone is cooled to 10° C. and a solution of approximately 5 parts of sodium hydroxide in 150 parts of water is added with thorough agitation so that the temperature does not rise appreciably above 10° C. 1.5 parts of magnesium sulphate is then added after which 150 parts of 28% hydrogen peroxide is added slowly over a period of about one-half hour; the temperature being maintained at about 10° C. Thereafter, the mixture is stirred for about forty-five minutes to complete the reaction.

100 parts of sodium sulphate is then stirred into the reaction mixture and, after a few hours, the organic layer is separated and distilled. The fraction boiling at 130–138° C. is collected separately and consists of nearly pure 1-acetyl, 1-methyl, 1,2-epoxy-ethane, which is obtained in more than 48% yield.

The equation for the reaction may be written as follows:

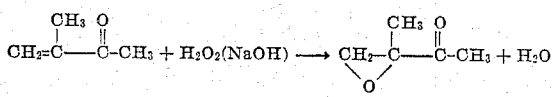

1-acetyl, 1-methyl, 1,2-epoxy-ethane is a colorless liquid having a mild and agreeable odor and having a boiling point of 130–132° C. Analysis showed that it contained 59.8% of carbon (as compared to the theoretical 60%) and 8.4% of hydrogen (as compared to the theoretical 8%).

Other physical constants of this compound are melting point —45 to —47° C.; specific gravity at 20° O. 9476; $n_D^{20°}$ 1.4192.

This compound is soluble in water up to about 24% by weight while water is soluble in it up to about 5% by weight at 23° C.

*Example 7*

116 parts of cinnamyl methyl ketone (benzal acetone), 3 parts of sodium hydroxide and 0.9 part of magnesium sulphate heptahydrate were agitated with 114 parts of water at approximately 50° C. This higher temperature was used to melt the benzal acetone since we have found that the reaction proceeds better when the ketone is in a liquid phase. 115 parts of 30% hydrogen peroxide was added over a period of approximately one-half hour. After stirring an additional two and one-half hours at approximately 50°, the mixture was cooled and the lower layer was separated and vacuum distilled.

The fraction boiling at 141–147° C. was found to contain cinnamyl methyl ketone epoxide in good yield.

By following the procedure outlined above, it is possible to prepare other unsaturated ketone epoxides, as for example epoxides of vinyl methyl ketone, amylene methyl ketone, benzalacetophenone, etc.

We have found that the yield of epoxide is reduced when the amount of water in the reaction mixture is decreased unduly. Thus, for example, when the reaction mixture contained 98 parts of mesityl oxide epoxide, 4 parts of sodium hydroxide and 58 parts of hydrogen peroxide, the presence of only 10 parts of water gave no yield whatever. When the water was increased to 25 parts, the yield rose to 25%. When the water was increased to 100 parts, the yield rose to 79%. When the water was increased to 158 parts, the yield rose to 80%, while a further increase of water to 200 parts gave no further increase in yield; the yield remaining at about 80%.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described our invention, we claim as new and desire to protect by Letters Patent:

1. A process for preparing epoxides of unsaturated ketones which comprises treating a compound having the formula

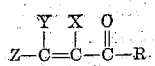

wherein R represents an alkyl or aryl group and X, Y and Z are alkyl, aryl, aralkyl or hydrogen in well-agitated aqueous suspension with hydrogen peroxide in the presence of a small amount of a water soluble salt of an alkaline earth metal.

2. A process for preparing epoxides of unsaturated ketones which comprises treating a compound having the formula

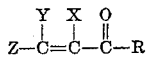

wherein R represents an alkyl or aryl group and X, Y and Z are alkyl, aryl, aralkyl or hydrogen in well-agitated aqueous suspension with hydrogen peroxide in the presence of a small amount of a water soluble magnesium salt.

3. A process for preparing epoxides of unsaturated ketones which comprises treating a compound having the formula

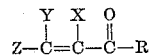

wherein R represents an alkyl or aryl group and X, Y and Z are alkyl, aryl, aralkyl or hydrogen in well-agitated aqueous suspension with hydrogen peroxide in the presence of a small amount of a water soluble salt of an alkaline earth metal, salting out the reaction mixture, separating and fractionally distilling the organic layer, and recovering the epoxide from the distillate.

4. A process for preparing epoxides of unsaturated ketones which comprises treating a compound having the formula

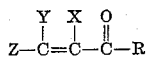

wherein R represents an alkyl or aryl group and X, Y and Z are alkyl, aryl, aralkyl or hydrogen in well-agitated aqueous suspension with hydrogen peroxide in the presence of a small amount of a water soluble magnesium salt, salting out the reaction mixture, separating and fractionally distilling the organic layer, and recovering the epoxide from the distillate.

5. A process for preparing mesityl oxide epoxide which comprises treating mesityl oxide in well-agitated aqueous suspension with hydrogen peroxide in the presence of a small amount of a water soluble salt of an alkaline earth metal.

6. A process for preparing mesityl oxide epoxide which comprises treating mesityl oxide in well-agitated aqueous suspension with hydrogen peroxide in the presence of a small amount of a water soluble magnesium salt.

7. A process for preparing mesityl oxide epoxide which comprises treating mesityl oxide in well-agitated aqueous suspension with hydrogen peroxide in the presence of a small amount of a water soluble salt of an alkaline earth metal, salting out the reaction mixture, separating and fractionally distilling the organic layer, and recovering the epoxide as a fraction boiling at approximately 154–158° C.

8. A process for preparing 1-acetyl, 1-methyl, 1,2-epoxy-ethane which comprises treating methyl isopropenyl ketone in well-agitated aqueous suspension with hydrogen peroxide.

9. A process for preparing 1-acetyl, 1-methyl, 1,2-epoxy-ethane which comprises treating methyl isopropenyl ketone in well-agitated aqueous suspension with hydrogen peroxide in the presence of a small amount of a water soluble salt of an alkaline earth metal.

10. A process for preparing 1-acetyl, 1-methyl, 1,2-epoxy-ethane which comprises treating methyl isopropenyl ketone in well-agitated aqueous suspension with hydrogen peroxide in the presence of a small amount of a water soluble magnesium salt.

11. A process for preparing 1-acetyl, 1-methyl, 1,2-epoxy-ethane which comprises treating methyl isopropenyl ketone in well-agitated aqueous suspension with hydrogen peroxide, salting out the reaction mixture, separating and fractionally distilling the organic layer, and recovering the epoxide as a fraction boiling at approximately 130–138° C.

12. A process for preparing cinnamyl methyl ketone epoxide which comprises treating cinnamyl methyl ketone in well-agitated aqueous suspension with hydrogen peroxide in the presence of a small amount of a water soluble salt of an alkaline earth metal.

13. A process for preparing cinnamyl methyl ketone epoxide which comprises treating cinnamyl methyl ketone in well-agitated aqueous suspension with hydrogen peroxide in the presence of a small amount of a water soluble magnesium salt.

14. 1-acetyl, 1-methyl, 1.2-epoxy-ethane.

RICHARD S. WILDER.
ARTHUR A. DOLNICK.

REFERENCES CITED

The following references are of record in the file of this patent:

FOREIGN PATENTS

| Number | Country | Date |
|--------|---------|------|
| 395,435 | Germany | 1924 |

OTHER REFERENCES

Unit Processes in Organic Synthesis, by Groggins, 1938, pub. by McGraw-Hill, N. Y., pages 673 and 657. (Copy in U. S. Patent Office.)